Oct. 17, 1967  M. G. BOISSEVAIN  3,347,278
CURVILINEAR LOOM
Filed Aug. 2, 1965  9 Sheets-Sheet 1
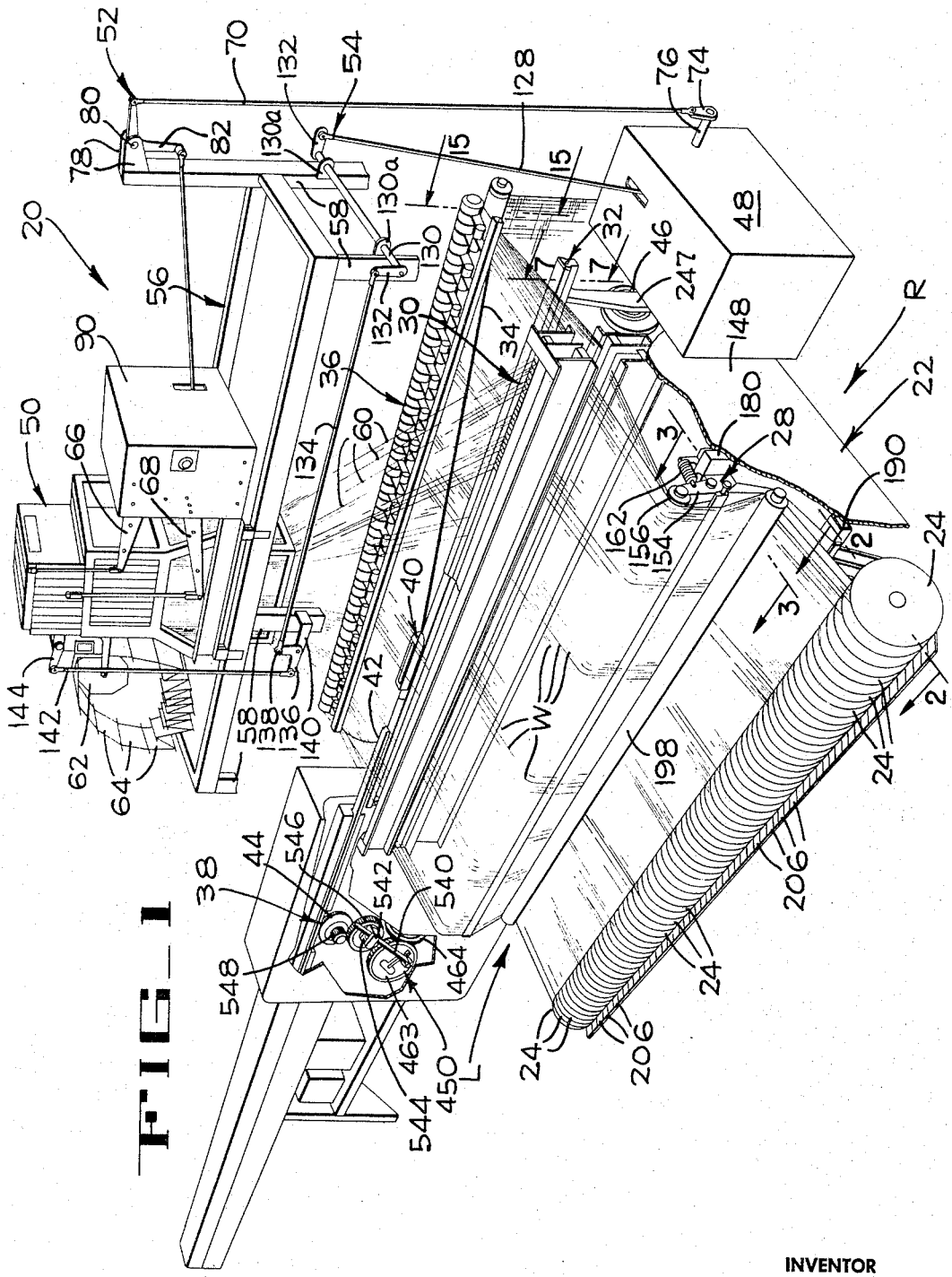
INVENTOR
MATHEW G. BOISSEVAIN
BY *Hans G. Hoffmeister*
ATTORNEY

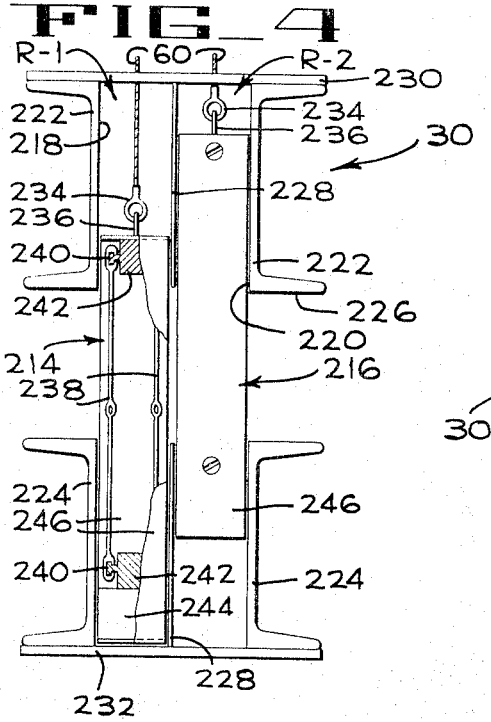
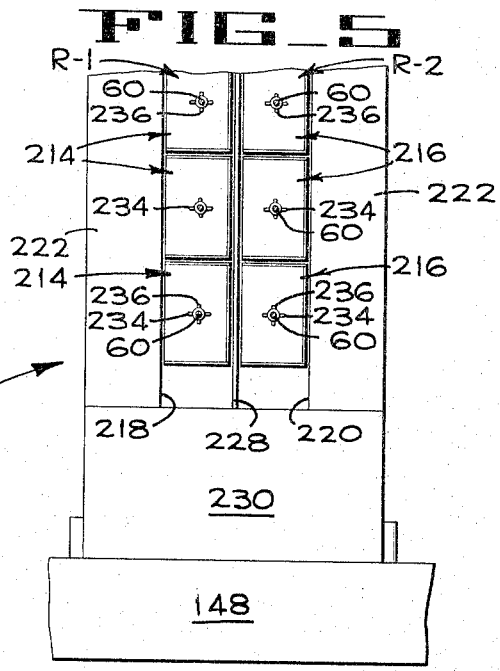
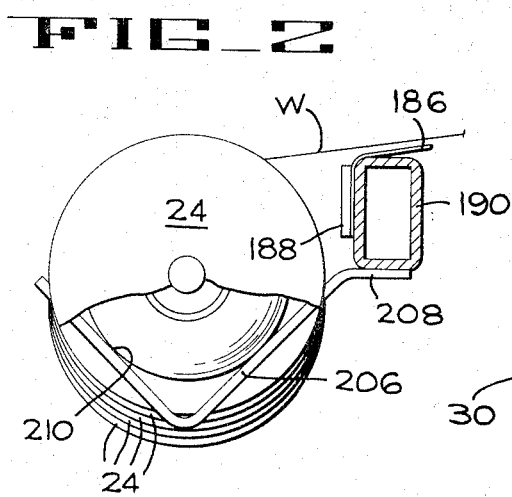
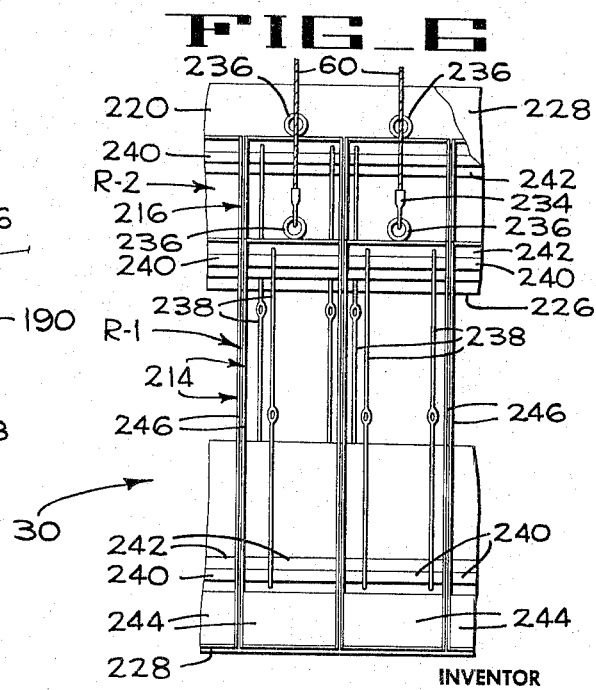

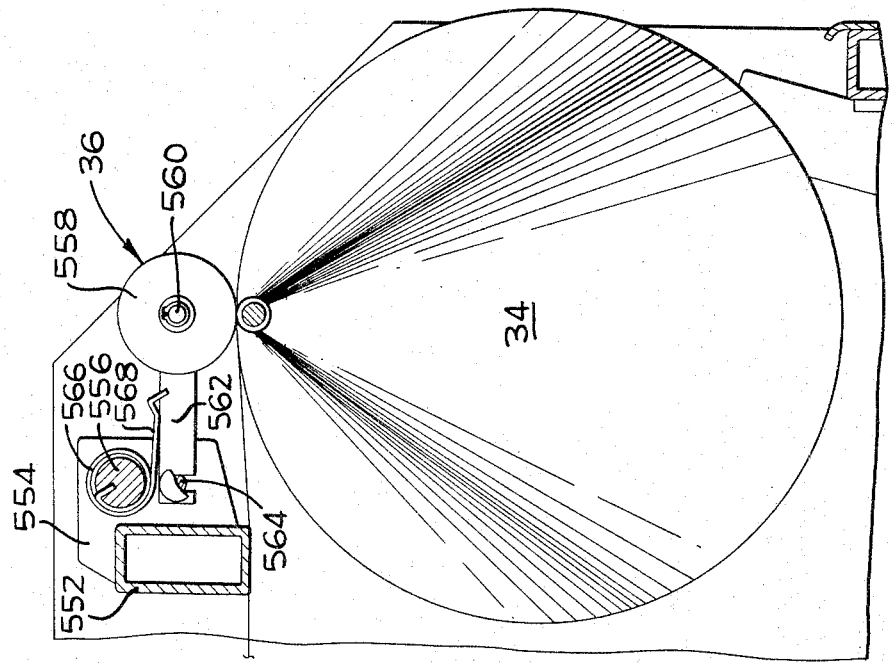
FIG_15
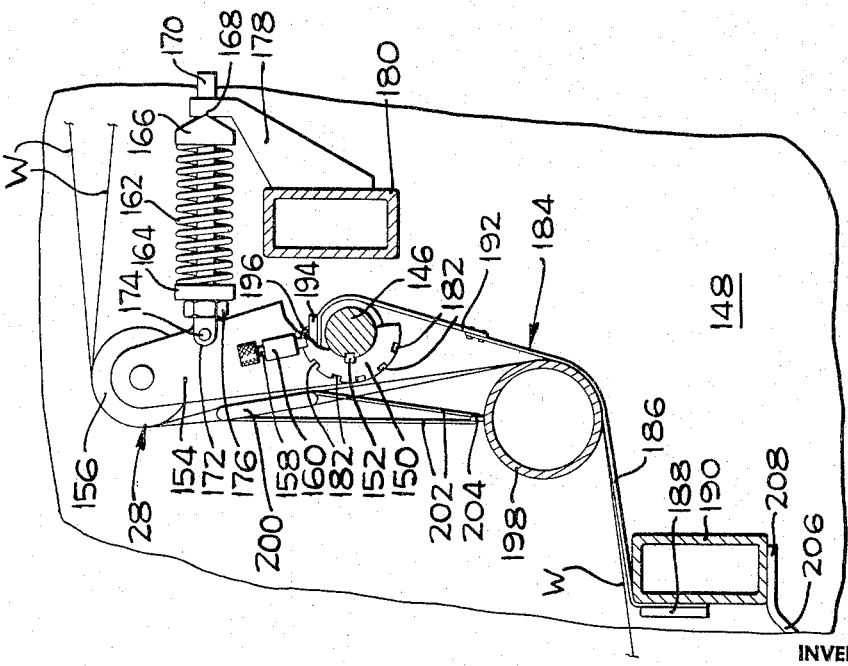
FIG_3
INVENTOR
MATHEW G. BOISSEVAIN
BY Hans G. Hoffmeister
ATTORNEY

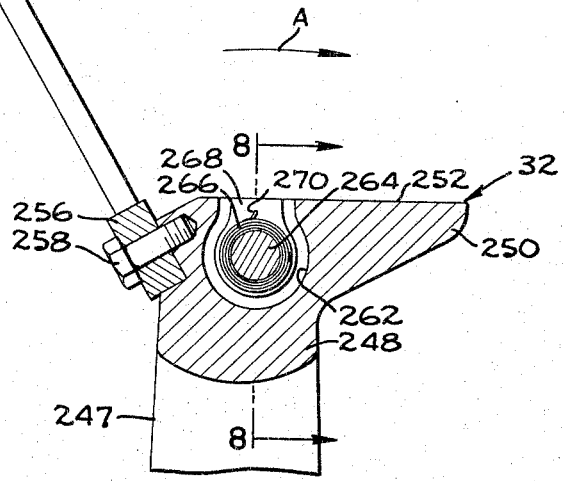
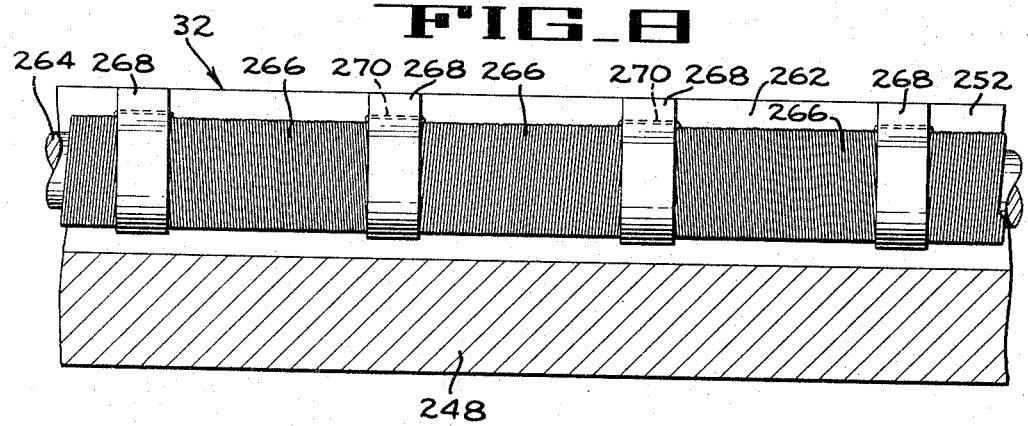

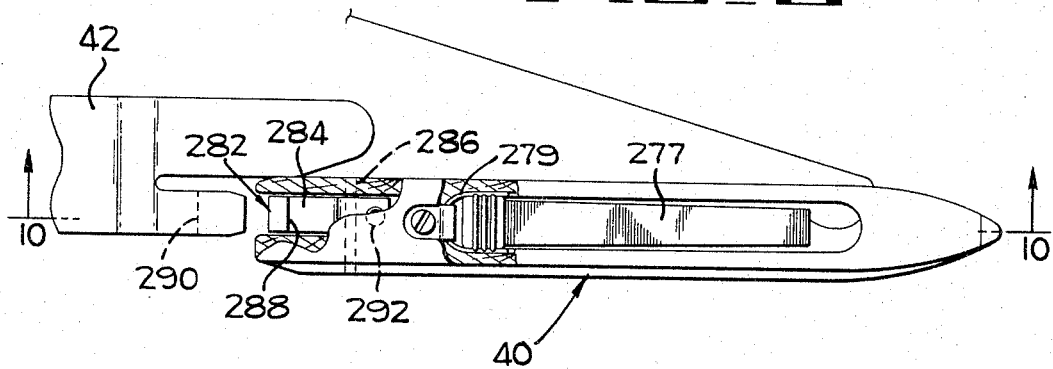
FIG_9
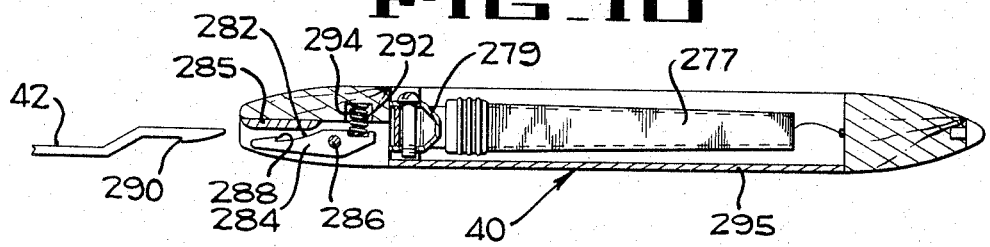
FIG_10
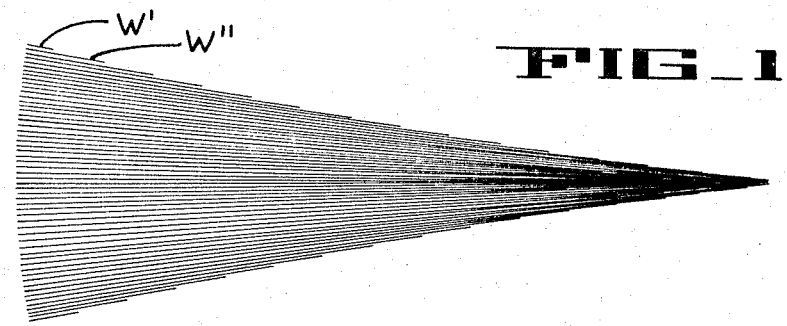
FIG_17
INVENTOR
MATHEW G. BOISSEVAIN
BY *Hans G. Hoffmeister*
ATTORNEY

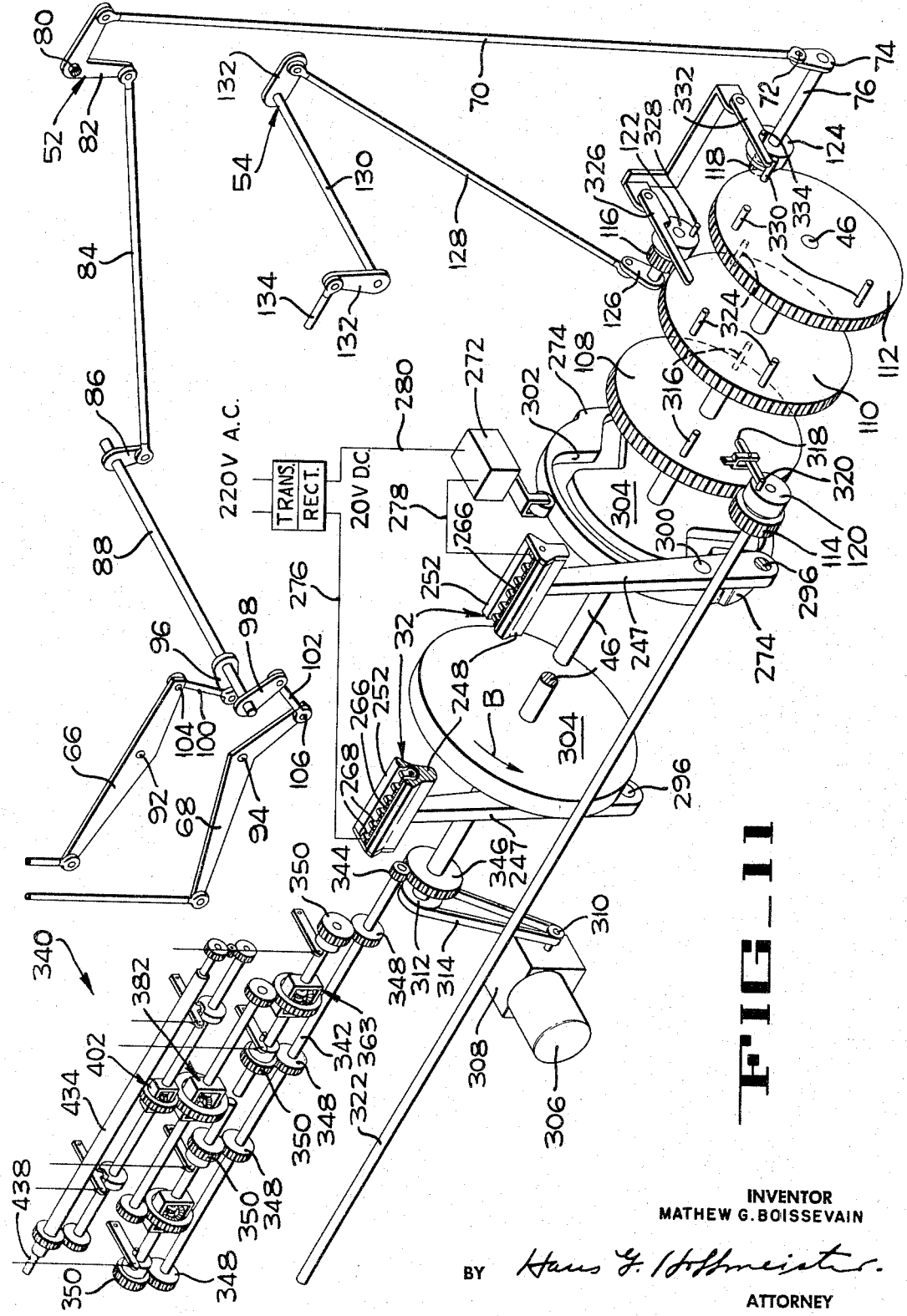

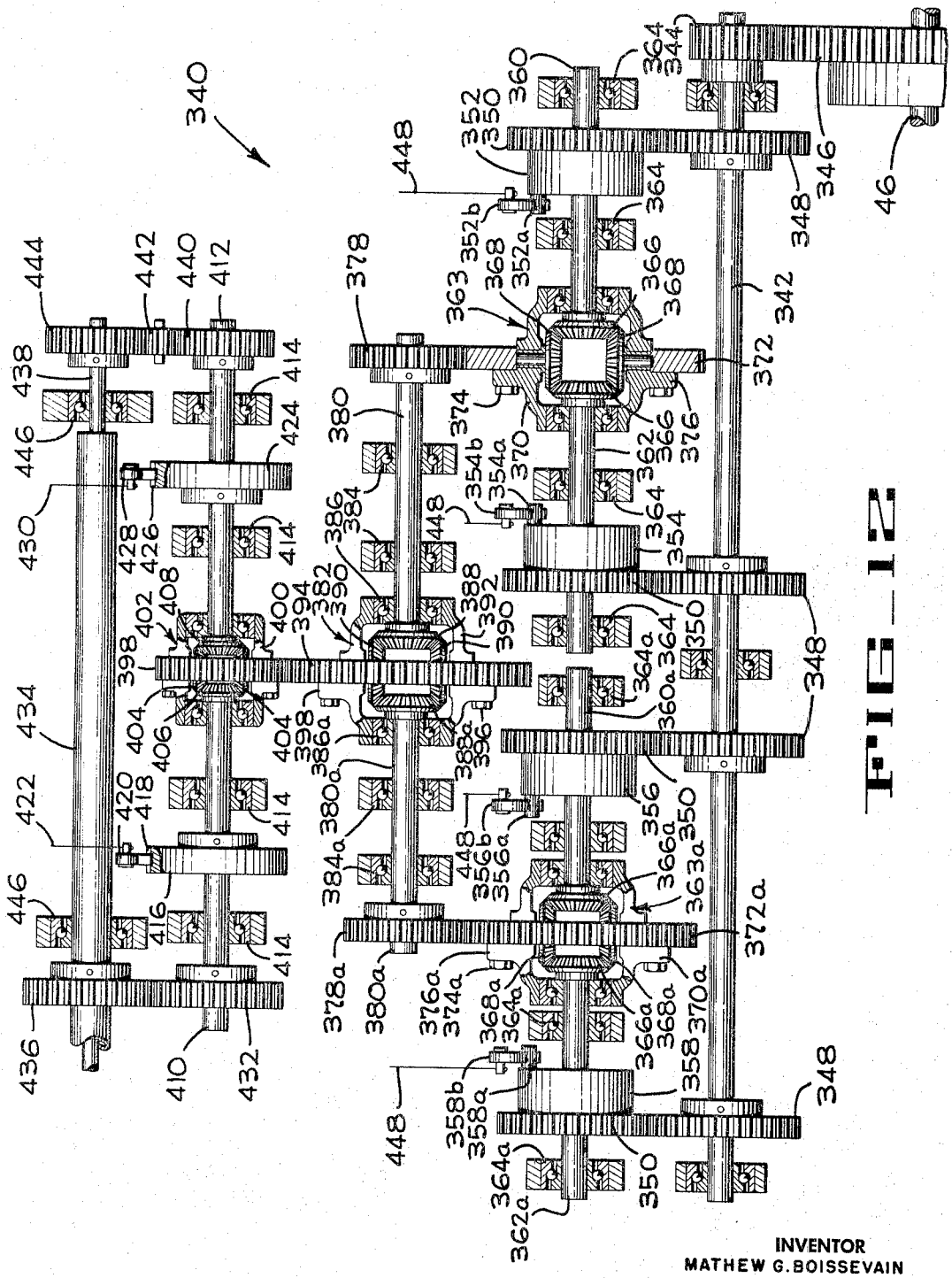

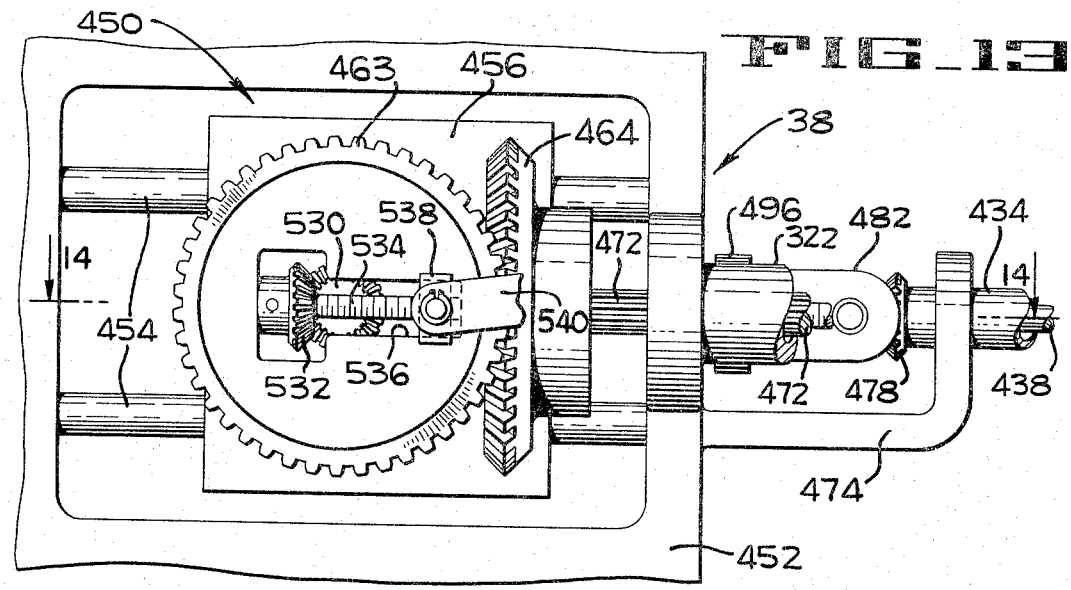
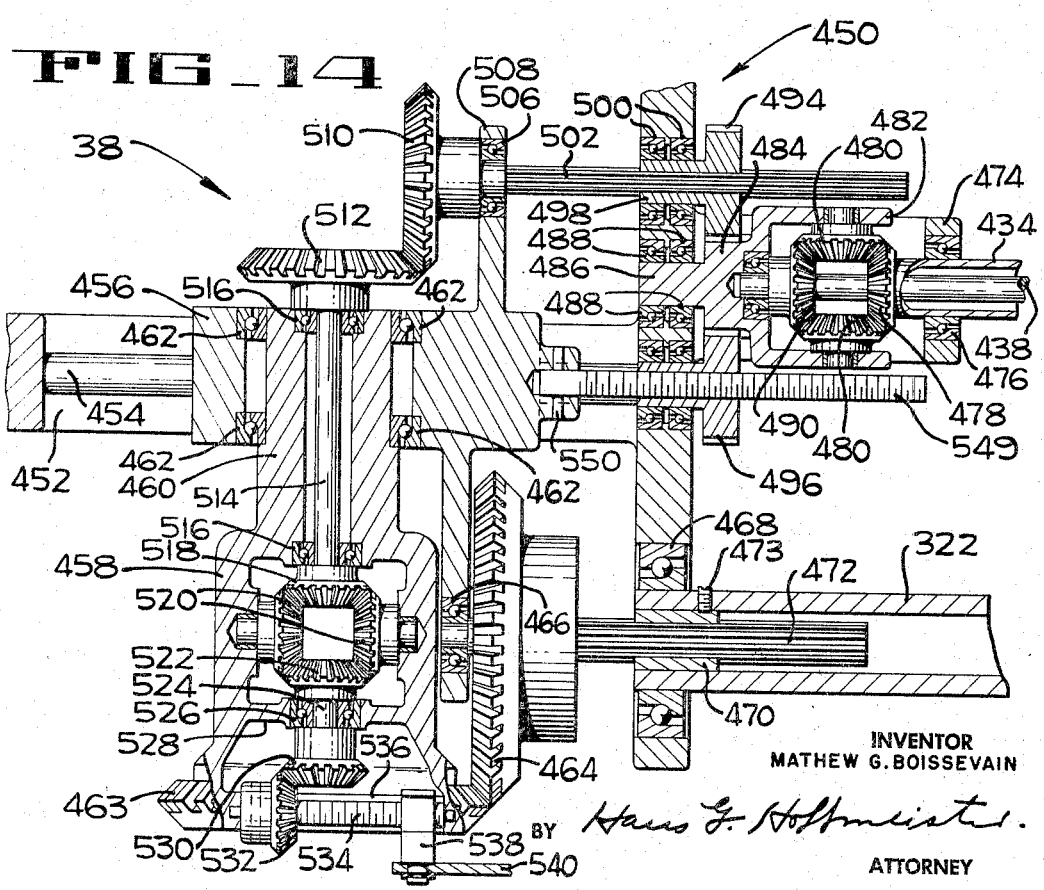

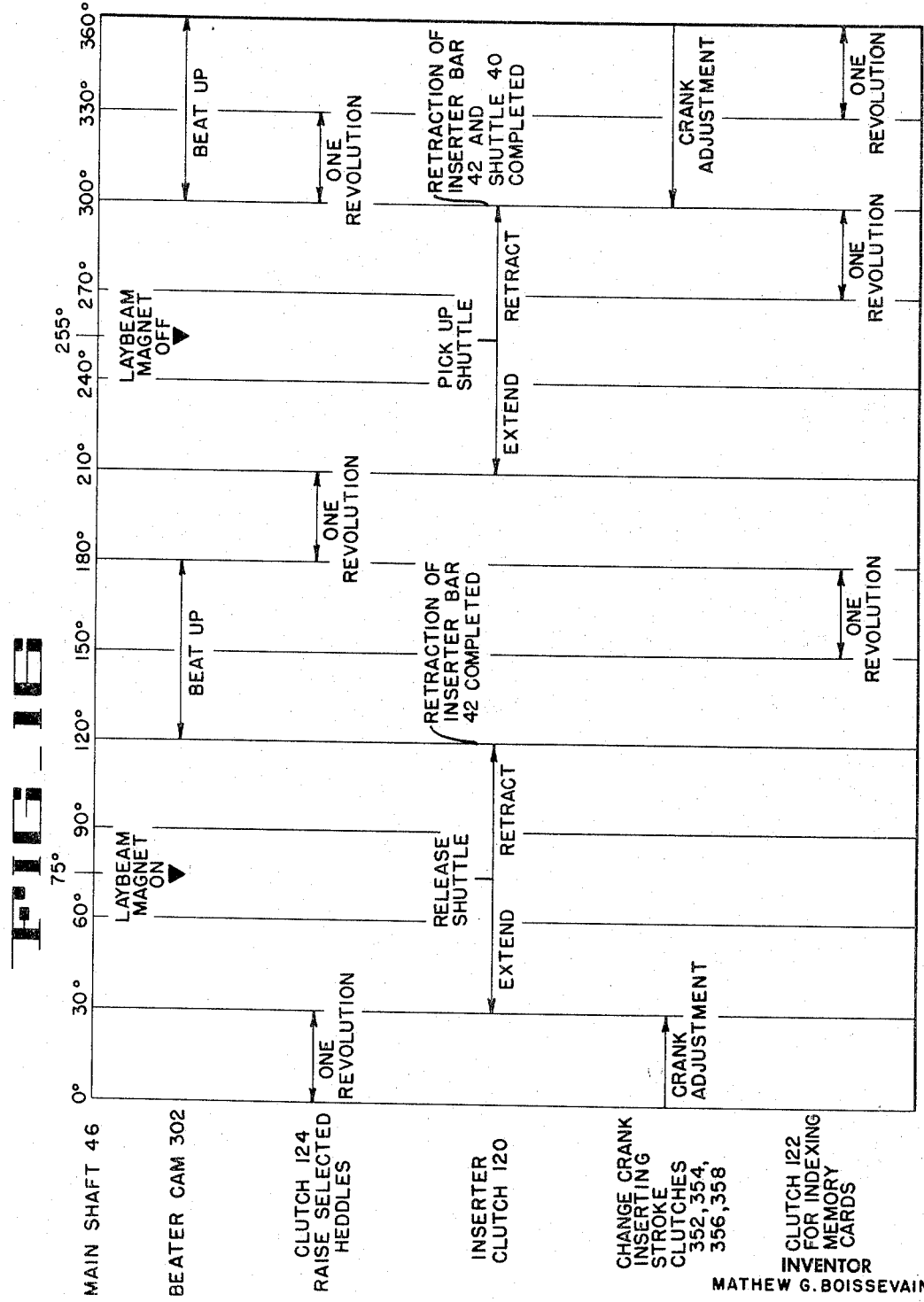

United States Patent Office 3,347,278
Patented Oct. 17, 1967

3,347,278
CURVILINEAR LOOM
Mathew G. Boissevain, Los Altos, Calif., assignor to FMC Corporation, San Jose, Calif., a corporation of Delaware
Filed Aug. 2, 1965, Ser. No. 476,252
15 Claims. (Cl. 139—11)

This invention relates to a loom for weaving cloth and more particularly to a loom for weaving curvilinear cloth.

The product produced by the loom of this invention may find utility in fabric floor coverings, apparel, umbrellas, and parachutes.

Whenever it is desired to cover an annular floor area or make a piece of circular cloth for apparel such as a skirt, it is conventional practice to cut circular segments from a piece of straight cloth such that when they are joined together they define the desired shape. For example, an umbrella and a parachute are made of pie-shaped segments which are sewn together to form a generally hemispherical shape.

In the case of a parachute it is of critical importance to produce a canopy which will not fail when it is controlling the rate of descent of an object attached thereto. Of the more important considerations in the designing of parachutes are the strength of fabric and the strength of the seams joining the various circular segments together. These two design aspects will determine, in conjunction with other elements supporting the object being parachuted, the maximum weight which can be handled by a particular parachute.

The curvilinear loom constructed in accordance with the present invention produces circular cloth by feeding the warped threads in progressively decreasing increments from one selvage to the other thereby resulting in curved selvages whose radius of curvature would be dependent upon the incremental difference at which each warped thread is advanced.

Such incremental feeding of the warped threads is accomplished by providing a tapered take-up roller whose angle of taper is dictated by the desired circumference or radius of curvature of the cloth to be produced. In order to produce a circular piece of cloth having a generally uniform density of weave, the length of the weft thread must gradually increase until one or more weft threads extend the full length of the cloth and then the length of such thread is gradually decreased thereby defining a generally triangular pattern having a substantially uniform density of weave.

From the above it is obvious that the transverse extent of the shed produced by the heddles must continually vary in accordance with the above noted triangular pattern and also, in order to keep the weft threads tight, the stroke of the shuttle must vary in accordance with the length of the shed.

Continual variation of the length of the weft thread is achieved by a unique construction of the lay beam, the shuttle, and a shuttle inserting and retracting mechanism. The lay beam which also carries a reed structure for beating the weft in place, is provided with a series of rather closely longitudinally spaced electromagnets extending the entire length of the lay beam. Means, including a limit switch, is operable to energize and de-energize the electromagnets in timed relation with the actuation of the shuttle. While the shuttle of the present invention is in general appearance of convenional design, it includes a metal plate which lies adjacent the upper surface of the lay beam. This metal plate is magnetically attracted by the electromagnets in the lay beam so that the shuttle is held in place on the lay beam during the beatup stroke.

The shuttle inserting and retracting mechanism of the present invention is constructed and arranged to progressively increase the stroke of the shuttle until one or more weft threads, depending upon the radius of curvature of the circular cloth desired to be produced, extends the entire transverse width of the loom and then the stroke of the shuttle is progressively decreased. It will be apparent that such a weaving program produces a weft thread pattern which is generally triangular in shape thereby resulting in a density of weave which is substantially uniform.

Such a variation in the length of adjacent weft threads to produce the generally triangular pattern requires a heddle mechanism which will define a shed of progressively increasing and decreasing lengths. In fulfilling this requirement the heddle mechanism of this invention comprises discreet heddles which can vary in width, but for purposes of this disclosure are two inches wide, and are aligned in two transverse rows extending the entire width of the machine. A standard Jacquard device is utilized for actuating the heddles to produce the shed of gradually increasing and gradually decreasing extent. Additional control outputs from the Jacquard device are utilized to vary the stroke of the shuttle inserting mechanism in accordance with the length of the shed.

From the above it can be seen that a loom constructed in accordance with the present invention will be capable of automatically producing curvilinear cloth having a substantially uniform density of weave.

Accordingly it is an object of this invention to provide a new and improved curvilinear loom.

Another object of this invention is to provide a loom for weaving circular cloth which has a substantially uniform density of weave.

Another object of this invention is to provide a mechanism which is operable to automatically differentially feed adjacent warp threads.

Another object of this invention is to manipulate the warped threads to produce a shed of progressively increasing length and to correlate the travel of the shuttle in accordance with the length of the shed.

Another object of this invention is to progressively increase the stroke of the shuttle from a selected reference point.

Another object of this invention is to provide a new and improved lay beam which is arranged to support and hold a shuttle at any position along its length during the beatup stroke of the weft threads.

The manner in which these objects are achieved will be apparent from the following detailed description of the invention.

In the drawings:

FIGURE 1 is a perspective of the curvilinear loom constructed according to the invention.

FIGURE 2 is a transverse section taken substantially along the line 2—2 of FIGURE 1 showing the support for the warp spools.

FIGURE 3 is an enlarged section taken substantially along line 3—3 of FIGURE 1 showing a device for applying a predetermined tension to all of the warped threads.

FIGURE 4 is an enlarged side elevation of the heddles.

FIGURE 5 is a plan of FIGURE 4.

FIGURE 6 is a front elevation of the heddles shown in FIGURE 4.

FIGURE 7 is an enlarged transverse section of the lay beam taken substantially along the line 7—7 of FIGURE 7.

FIGURE 8 is a fragmentary longitudinal section of the lay beam taken substantially along the line 8—8 of FIGURE 7.

FIGURE 9 is a plan projection of the shuttle and a portion of the shuttle inserting rod.

FIGURE 10 is a section taken substantially along line 10—10 of FIGURE 9.

FIGURE 11 is a perspective of the drive for the loom including a schematic showing the electrical circuit for energizing the electromagnets associated with the lay beam.

FIGURE 12 is a diagrammatic of a transmission, including a plurality of one revolution clutches actuated by the Jacquard for varying the stroke of the shuttle inserting mechanism.

FIGURE 13 is an enlarged front elevation of the drive for actuating the shuttle inserter.

FIGURE 14 is a section taken substantially along the line 14—14 of FIGURE 13.

FIGURE 15 is an enlarged transverse section taken substantially along line 15—15 of FIGURE 1 showing spring loaded pressure rolls employed for feeding the cloth through the machine.

FIGURE 16 is a timing diagram illustrating the sequence of the various functions of the loom during one revolution of the main shaft.

FIGURE 17 is a diagrammatic of a portion of the cloth produced by the loom of this invention.

Referring to FIGURE 1, there is shown the general organization of the preferred form of the loom constructed according to this invention, and it is generally indicated by the numeral 20. The major components of the loom include a frame structure 22 supporting a pluarlity of narrow warp thread spools 24 upon each of which are wound a selected number of warp threads. These spools are arranged to be independently freely rotated to thereby enable each warp thread to be fed at progressively increasing rates from the right side R to the left side L as viewed in FIGURE 1. Each of the warp threads passes through a warp tensioning device 28 which is manually adjustable to apply a desired tension to each warp thread. A heddle mechanism 30 is provided with individual heddle frames adapted to produce a shed of varying width. Two transverse rows of such heddle frames, each row having a plurality of heddle frames, are provided which extend the entire width of the loom. The heddle frames are actuated in accordance with a predetermined sequence to produce a shed of gradually increasing and gradually decreasing length in order to produce a desired weave density.

From the heddle mechanism the warp threads pass over a lay beam 32 which includes a reed structure for beating the weft threads in place, as will hereinafter be made clear. Means are provided for oscillating the lay beam in timed relation with the actuation of the heddles and the insertion of the weft thread. The warp threads are then passed over a tapered take-up roller 34 (FIG. 15) having associated therewith transversely aligned spring biased pressure rolls 36 which exert a sufficient amount of pressure on the cloth produced to effect feeding of the cloth. A conventional worm drive and ratchet feed may be provided for positively indexing the tapered roller 34 in timed relation with the operation of the heddle mechanism and the lay beam.

It can be seen that the structure thus far described will effect differential feeding of all of the warp threads with the warp thread at the extreme left hand side of the loom being fed at greater increments since the surface displacement of the tapered roller 34 is greatest at this point due to its larger diameter and the warp thread on the extreme right side of the machine will be fed at the smallest increments due to its being drawn through the machine by that portion of the tapered roll having the smallest diameter.

A variable stroke shuttle inserting mechanism, generally indicated by the numeral 38, is arranged to translate a shuttle 40 along the upper surface of the lay beam 32 a sufficient transverse distance corresponding to the length of the shed produced by the heddle mechanism 30. The mechanism 38 includes an elongated relatively thin shuttle inserting bar 42, which is rectangular in cross-section and is provided with transverse teeth which are in meshing engagement with an output gear 44 which is part of the transmission for actuating the bar 42. It will be recalled that the lay beam 32 is provided with electromagnets which are operative to attract and hold the shuttle 40 thereon by virtue of the fact that the shuttle includes the metal plate attracted by the magnets. These magnets are also operative to unlatch the shuttle 40 from the shuttle inserting bar before the bar is retracted to its starting position. It is evident that the shuttle inserting bar 42 must be retracted between subsequent beatup strokes in order to prevent breakage of the warp threads.

Immediately after the lay beam is reciprocated to beat a weft thread in place and upon its return to the retracted position shown in FIGURE 1 the inserting mechanism is actuated extending the shuttle inserting bar 42 a sufficient distance to engage the shuttle 40 and immediately after such engagement the magnet in the lay beam 32 is turned off permitting closure of the latch in the shuttle to again attach the shuttle to the inserting bar 42 allowing the inserting bar to return the shuttle to its starting position.

The main shaft of the loom indicated by the numeral 46 is rotated by a suitable motor in a manner which will hereinafter be described in more detail. The main shaft has mounted thereon several gears located in a compartment 48. These gears are coupled with single revolution clutches to actuate a standard Jacquard apparatus 50 by way of the system of linkages 52 and 54. The Jacquard apparatus is mounted on a suitable frame 56 having legs 58 which may have their lower ends attached to the frame 22.

Each of the heddle frames of the heddle mechanism 30 is attached to a Jacquard string. All of these strings are designated by the numeral 60. The Jacquard is operated to produce the shed of gradually increasing length until it reaches the entire width of the loom and then it reduces the length of the shed in accordance with the triangular pattern of weave which is required for weaving the curvilinear cloth. The Jacquard also includes an indexible drum 62 which presents a series of interconnected program cards 64 to a mechanical reading station which determines which of the Jacquard strings 60 are to be actuated in order to produce a shed at any particular time of the desired length.

The linkage system 52 has the prime function of simultaneously rocking levers 66 and 68 toward and away from each other and thereby actuate the Jacquard strings 60. This linkage system comprises a connecting rod 70 having its lower end freely mounted on a crank pin 72 which is secured to a crank 74 mounted on a countershaft 76 driven by the main shaft 46 through a single revolution clutch 124 (FIG. 11). One of the legs 58 of the Jacquard frame 56 extends upwardly and has secured thereon a pair of spaced brackets 78 between which is pivotally mounted, by means of a pin 80, a bell crank 82. The upper end of the connecting rod 70 is connected to one arm of the bell crank. As shown in FIGURE 11, the remaining arm of the bell crank has one end of a rod 84 pivotally connected thereto with the remaining end pivotally connected to a lever 86 which is secured to a shaft 88 rotatably mounted in a housing 90 (FIG. 1) supported on the Jacquard frame 56. The levers 66 and 68 are pivotally connected at 92 and 94, respectively, to the housing 90 and are rocked toward and away from each other during oscillation of the shaft 88 by means of levers 96 and 98, which are fixed to the shaft 88, and links 100 and 102, which are pivotally connected to the free ends of the levers 96 and 98 and to the levers 66 and 68 at 104 and 106 respectively. It is evident by the above construction that during rotation of the crank 74 the crank pin 72 is effective to cause reciprocation of the rod 70 which, by virtue of the bell crank 82 and the rod 84, rocking motion is transmitted to the shaft 88 which in turn causes oscillation of the levers 66 and 68 and accordingly actuation of the Jacquard.

In timed relation with the actuation of the levers 66 and 68 the drum 62 (FIG. 1) is indexed to present the various program cards to the mechanical reader of the Jacquard. This linkage system is also actuated by the rotation of the main shaft 46. Referring to FIGURE 11 it will be seen that the right end of the main shaft (as viewed in FIGURE 11) has three axially spaced gears 108, 110 and 112 secured thereon and each of these gears is in meshing engagement with gears 114, 116 and 118 respectively, which are the inputs to single revolution clutches 120, 122 and 124. These clutches are of conventional design and per se do not form part of this invention. Clutches of this type which have been found suitable for incorporation into the present apparatus are manufactured by the Hilliard Corporation located at 100 W. Fourth St., Elmira, N.Y. The output of the single revolution clutch 122 has a short link 126 fixed thereon and on the free end of this link the lower end of a connecting rod 128 is pivotally connected. As shown in FIGURE 1 a shaft 130 is rotatably mounted in brackets 130a secured to a pair of the legs 58. On the end portion of this shaft small links 132 are rigidly connected and one of them has the upper end of the rod 128 pivotally connected thereon and the remaining one has a transversely extending rod 134 also pivotally connected thereon. The remaining end of the rod 134 is pivotally connected to a bell crank 136 at 138 while the bell crank itself is pivotally connected to a bracket 140 which is fixed to the frame of the Jacquard. A rod 142 has its lower end pivotally connected to the above crank 136 and its upper end pivotally connected to a lever 144 which is operable to effect indexing of the drum 62. Thus it is seen that the linkage mechanism 54 is effective to cause indexing of the drum 62 during rotation of the main shaft 46 and, as will hereinafter be more particularly described, such indexing of the drum 62 takes place in time relation with the rotation of the main shaft 46.

One novel feature of this invention relates to the warp tensioning device 28 which is shown in enlarged detail in FIGURE 2. Since each warp thread is drawn through the loom at a rate of speed determined by that portion of the tapered roller at which it is attached, the illustrated tensioning device must function to apply a predetermined tension to each warp thread regardless of the speed at which it is drawn through the loom. As shown in FIGURE 3 the tensioning device comprises an elongate shaft 146 extending the entire width of the loom and it has the ends thereof rotatably mounted in side-frame members 148 (only one of which is shown in FIGURE 1) which are part of the frame structure 22. On the opposite ends of this shaft, and inwardly adjacent the sideframe members 148, small discs 150 are secured for rotation with the shaft 146 by short keys 152. Inwardly adjacent each of these discs and freely rotatably mounted on the shaft 146 are radially extending arms 154 which support a rod 156 which extends substantially the entire width of the loom. Associated with each of these arms 154 there is a spring biased pin 158 mounted for axial movement in a projection 160 which is rigidly connected to the radial arms 154.

Each of the arms 154 is biased in a counterclockwise direction, as viewed in FIGURE 3, by a spring 162 located between a flat washer 164 and a washer 166 formed with sloping sides which define an edge 168. A guide pin 170 has a bifurcated end 172 pinned at 174 to an inward portion of the arm 154. As shown in FIGURE 3 the pin 170 extends through the spring 162 and the washers 164 and 166 and it is threaded so that an adjustment nut 176 may be mounted thereon serving the function of adjusting the bias of the spring 162. The guide pin 170 has its free end supported by a bracket 178 secured to a transverse brace 180 which is secured to the sideframe members 148. The hole in the bracket 178 through which the pin 170 extends has a clearance which is sufficient to permit freedom of movement of the pin 170 when the arm 154 is rotated on the shaft 146.

The disc 150 is provided with a series of circumferentially spaced slots 182 for receiving the end of the pin 158. Since the radial arms 154 are freely rotated on the shaft 146 and the discs 150 are keyed to this shaft relative rotatable movement between the arms 154 and the discs 150 can be effected. When the pin 158 is seated in one of the slots 182 the counterclockwise bias imparted to the arms 154 by the spring 162 is transferred to the shaft 146 and accordingly causing counterclockwise rotation of this shaft.

A two piece friction belt 184 has a portion 186, preferably made of canvas of the type used for conveyor belts, extending the entire width of the loom and has one end attached by means of a strap 188 to another transverse brace 190. The canvas portion of the friction belt is attached in any suitable manner to a sheet of rubber 192 which is in turn attached to an enlarged diameter portion of the shaft 146 by means of an elongated strap 194 overlying a milled flat formed on the shaft 146 and secured to the shaft by a plurality of spaced screws 196. A snubber tube 198, positioned in the location shown in FIGURE 3 with respect to the transverse brace 190 and the shaft 146, has its ends supported on the frame of the loom and a peripheral portion thereof is in intimate engagement with the canvas piece 186. The warp threads indicated by the letter W are passed between the belt 184 and the snubber tube 198 then upwardly past a conventional warp separator bar 200 and over rod 156. From this point each of the warp threads are threaded through appropriate heddle wires. The separator bar 200 is attached to the snubber tube 198 by small strings 202 laced through eyelets 204 secured to the snubber tube 198. The separator bar assumes the position shown in FIGURE 3 by virtue of the friction applied by the warp threads which pass over the opposite faces of the separator.

According to the above described construction of the warp tensioning device it should be readily apparent that the bias of the spring 162 imparted to the radial arms 154 and to the discs 150 when the pins 158 are located in the slots 182 is transferred to the shaft 146 urging this shaft in a counterclockwise direction and accordingly applying tension to the two piece friction belt 184. It should also be apparent that the degree of tension on the friction belt can be adjusted by seating the pin 158 in any one of the various slots 182. For example when it is desired to increase the tension on the belt 184 the disc 150 is rotated in a clockwise direction while the pin 158 is retracted and then seating the pin in one of the slots. In addition, the self tensioning effect of arms 154, conventionally used to release tension on the warp beam, is used to release tension on canvas belt 184.

Another novel feature of this invention concerns the manner in which the various warp spools are rotatably supported in order to fulfill the function of differentially feeding all of the warp threads. A preferred manner in which this is brought about is shown in FIGURE 2 wherein several of the warp spools 24 are shown in transverse alignment. On the generally rectangular transverse brace 190 having each end supported by the frame of the loom, there is secured a V-shaped bracket 206 formed with a lateral extension 208 attached to the lower surface, preferably by welding, of the transverse bracket 190. There is one of these V-shaped brackets for each warp spool. The width of each bracket is slightly less than the dimension of the confronting annular faces of the spool so that when the spool is placed on the V-shaped bracket the warp threads contact the inner surface 210 of the brackets. Due to such contact the inner surface 210 is highly polished in order to avoid destruction of the warp threads and to insure free rotation of each warp spool. It will be apparent that each of the warp spools 24 will pay out the warp threads wound thereon in accordance with their position with respect to the tapered take-up roller. In addition due to the fact that the warp spools on the left hand side of the machine will pay out the warp threads at a substantially greater rate than the warp threads for example on the extreme right hand side of the machine the supply of warp threads on the left hand side will be exhausted much sooner thus requiring replacement of these spools. By mounting the warp spools on these V-shaped brackets such replacement of the warp spools is easily attained since all that is necessary is to merely lift out the empty spool and replace it with a fresh one without disturbing those spools not needing replacement.

In accordance with another novel feature of this invention a heddle mechanism is provided which is arranged to be actuated by the Jacquard device to produce a shed of progressively increasing transverse width until one or more sheds are produced extending the entire width of the loom and then the shed is gradually decreased in length until a shed of minimum length is produced. In this manner curvilinear cloth may be woven having a substantially uniform density of weave. Rreferring now to FIGURES 4, 5 and 6 which show a representative portion of the novel heddle mechanism of this invention it will be observed that there are two rows, R–1 and R–2 of longitudinally spaced heddle frames which extend the entire width of the loom. Longitudinally aligned heddle frames for example 214 and 216 are of sufficient width to accommodate all of the warp threads on a single warp spool. Accordingly there are two longitudinally adjacent heddle frames for each of the warp spools.

The heddle frames are slidably mounted in guideways 218 and 220 which are formed by an upper pair of spaced channels 222 and a lower pair of spaced channels 224 positioned in vertical spaced alignment to define a passageway 226 through which the warp threads W pass. Associated with each pair of channels and located an equal distance therebetween is a partition 228. The pairs of channels and the partitions 228 form the guideways 218 and 220 which guide the upward and downward movement of the heddle frames. The upper pair of channels 222 are interconnected by a plate 230 of short transverse extent (see FIG. 5) serving to maintain their spaced relationship and the lower pair of channels 224 are connected to a plate 232 of substantially the same length as the channels 224.

Each of the heddle frames has one of the Jacquard strings 60 attached thereto which are effective in response to the operation of the linkage system 52 (FIG. 11) to raise and lower the heddles in order to produce the shed. As shown best in FIGURE 4 each of the Jacquard strings are attached to the loop 234 being in turn connected to another loop 236 which is attached to the upper surface of the heddle frames.

Each heddle frame is provided with a series of heddle wires 238 whose ends are formed with T slots slidably receiving T bars 240 formed on small blocks 242. By mounting the heddle wires in this fashion they may be laterally adjusted along the T bars in order to space each warp thread a desired distance apart, as is conventional. Each heddle frame is provided with a small weight 224 located downwardly adjacent the lower block 242 and between side plates 246. These weights serve the function of lowering the heddle frames since the Jacquard device is merely operative to lift each of the heddle frames.

In view of the above description pertaining to the heddle mechanism it should be readily apparent that a shed can be produced having a length equal to the width of a pair of longitudinally adjacent frames or any multiple of heddle frames.

In accordance with another novel feature of this invention a unique construction of a lay beam is disclosed which is effective to assist in manipulating the shuttle to produce weft threads of varying length. In achieving this result the lay beam is formed to accommodate longitudinally spaced electromagnets throughout its entire length which serve to release the shuttle 40 from the shuttle inserting bar 42 at any point along the length of the lay beam. The electromagnet is of sufficient strength to hold the shuttle in its released position and a shuttle latch 284 (FIG. 10) in downward position after the inserting operation so that the inserter mechanism is able to again pick up the shuttle and return it to its starting position which is the extreme left hand side of the loom. Referring now to FIGURES 7 and 8 wherein the novel construction of the lay beam generally indicated by the numeral 32, is shown. The lay beam is supported by a pair of upwardly extending cam actuated sword arms 247 (also see FIG. 11) being operable to oscillate the beam toward and away from the tapered take-up roller 36. The lay beam comprises an elongated bar 248 made of non-magnetic metal such as aluminum. This bar has a lateral extension 250 in order to provide an upper surface 252 of sufficient width to carry the shuttle as it is traversed transversely of the loom. A beating structure comprising a plurality of reeds 254 of conventional design which are attached to a base plate 256 is mounted to extend upwardly and forwardly on the forward edge of the lay beam. The base plate is preferably attached to the bar 248 by a series of cap screws 258. The outwardly extending ends of the reeds are attached to an elongated bar 260 which serves the purpose of maintaining the spaced relationship between the reeds. The reeds 254 are very thin strips of metal which are highly polished and between which the warp threads pass. As the lay beam is oscillated in the direction of the arrow A the reeds 254 presses the weft thread deposited in the shed by the shuttle tightly against the previously deposited weft thread.

Extending the entire length of the lay beam is a slot 262 having a cross sectional shape as indicated in FIGURE 7. Within the slot there is mounted a rod 264 which serves as a core for electrical windings 266 and upon which are fixed in spaced relationship iron pole pieces 266. The windings 266 are continuous throughout the length of the rod 264 and bridge the pole pieces 268 through small holes 270 drilled in each pole piece. In accordance with conventional winding practice the winding on one side of a particular pole piece is right hand and on the other side it is left hand in order to maximize the lines of magnetic flux in each of the pole pieces. Since the rod 264, the pole pieces 268 and windings 266 do not fill the slot 262 the remaining space is filled with any suitable insulating material which can be poured into the remaining cavities after the described structure has been assembled.

As shown in FIGURE 11 the windings 266 is electrically connected to a source of 220 volts AC which is transformed and rectified to 20 volts DC. A limit switch 272 actuated by a cam 274 energizes and de-energizes the windings 266 in timed relation with the rotation of the main shaft 46. Electrical energy from the rectifier is connected to one end of the windings 266 by a lead 276 and the other end of the windings 266 is connected to the limit switch by a lead 278 and the limit switch is connected to the rectifier completing the circuit by another lead 280. Thus according to the above construction it will be apparent that the electromagnet in the lay beam is energized and de-energized in timed relationship with the rotation of the main shaft 46. In another form the electromagnet would be of conventional horseshoe design with the ends of the shoe running the full width of the lay beam 32, with a single winding around the U-shaped part of the shoe.

The above described lay beam finds particular utility when it is used with a shuttle constructed according to this invention. Referring now to FIGURES 9 and 10 there will be seen the novel shuttle of the present invention which is generally indicated by the numeral 40. The shuttle is of conventional configuration and it includes the usual bobbin 277 attached to the shuttle body by conventional spring clamp 279 and clevis 281. The shuttle is provided with a catch mechanism 282 operating to detachably connect the shuttle to the inserting bar 42. As shown most clearly in FIGURE 10 the catch includes a bar 284 pivoted to the shuttle body by a pin 286. The bar is formed with an undercut portion defining a lip 288 which is adapted to engage a complementary lip 290 formed on the leading offset portion of the inserter bar 42. A spring 292 located within an opening 294 formed in the shuttle body is provided for rocking the bar 284 in a clockwise direction about the pin 286 which in conjunction with a small metal plate 285 operates to hold the cooperating lips 288 and 290 into engagement and thereby positively holding the shuttle on the inserting bar 42. The bottom surface of the shuttle has an elongated metal plate 295 of a type which is attracted by the magnet in the lay beam. The plate 295 should have a length at least equal to the space between and the width of two adjacent pole pieces 268 thus permitting the shuttle to be securely held on the lay beam when the electromagnets are energized. Not only is the electromagnet and lay beam effective to hold the shuttle on its upper surface but it is also effective to rotate the bar 284 in a counterclockwise direction about the pin 286 and in opposition to the bias of the spring 292. Thus it is apparent that the electromagnets in the lay beam are not only effective to hold the shuttle thereon during the beating stroke but it is also effective to unlatch the inserting bar and permit retraction of said bar before the beating stroke is initiated.

Referring again to FIGURE 11 which shows the particular manner in which the lay beam is oscillated it will be seen that the sword arms 247 are pivotally mounted at 296 through a shaft 298 supported by the frame of the loom as is conventional. Inwardly extending stub shafts 300 (only one being shown) are secured to each of the arms 247 and rotatably support a cam follower roller (not shown) which is received in identical cam tracks 302 (only one being shown) formed on wheels 304 which are rigidly mounted to the main shaft 46. During one complete revolution of the main shaft the cam tracks 302 oscillate the lay beam 32 toward and away from the tapered take-up roller 34 two times.

A suitable motor 306 and a gear reduction unit 308 provided with an output shaft on which is mounted a pulley 310 is connected to another pulley 312, mounted on the main shaft 46 by a belt 314. The drive for the main shaft 46 may assume other forms such as a chain and sprocket drive or a gear transmission as long as the drive chosen in positive. The direction of rotation of the main shaft 46 is as indicated by the arrow B.

The preferred manner of actuating the Jacquard in order to raise and lower the heddle frames, to index the drum 62 and to drive the inserter bar 42 is best shown in FIGURE 11. As previously mentioned the gears 108, 110 and 112 which are fixed to the shaft 46 are associated respectively with one revolution clutches 120, 122 and 124. Considering the gear 108 it will be seen that it has a projecting pin 316 secured thereon for engaging and releasing a pawl 318 which is adapted to hold the output shaft of the one revolution clutch 120 against rotation in both directions by engaging a pin 320 which is conventionally attached to the one revolution clutch 120. When the pawl 318 is momentarily lifted, thereby disengaging the pin 320 an inserter drive shaft 322 is rotated 360 degrees since upon return of the pin 320 to the position shown in FIGURE 11 it is again engaged by the pawl 318. It will be noted that there are two pins 316 on the gear 108 thus allowing two complete revolutions of the inserted drive shaft 322 for every complete revolution of the main drive shaft 46.

On the gear 110 there are mounted three circumferentially spaced projecting pins 324 operating to release a pawl 326 which engages a pin 328 permitting the one revolution clutch 122 to actuate the linkage system 54 which indexes the Jacquard drum 62. Since there are three pins on the gear 110 the single revolution clutch makes three complete revolutions for every complete revolution of the main shaft 46.

In a similar manner the gear 112 has three projecting pins 330 mounted thereon for pivoting a pawl 332 which releases a pin 334 and allows the one revolution clutch 124 to rotate its output shaft 76 upon which the crank 74 is mounted. Such rotation of the output shaft 76 causes the linkage system 52 to be actuated and thereby operation of the heddles is effected. The single revolution clutch 124 rotates its output shaft three complete revolutions for every single revolution of the main shaft 46.

There is also shown in FIGURE 11 a mechanism, generally indicated by the numeral 340 for controlling the stroke of the inserter bar 42. As will be presently explained in detail this mechanism is driven by the main shaft 46 and it includes a plurality of single revolution clutches each of which is associated with a pivoted pawl operated by a string of the Jacquard mechanism. Although for purposes of describing this invention certain nominal gear ratios are given it is to be understood that various ratios may be selected depending upon the weaving pattern desired to be produced.

As shown in FIGURE 11 the mechanism 340 includes an elongated countershaft 342 supporting at one end a pinion gear 344 meshingly engaged with a gear 346 which is fixed on the main shaft 46. A plurality of axially spaced gears 348 are keyed to the shaft 342 and are in meshing engagement with gears 350 which are the inputs to single revolution clutches 352, 354, 356 and 358.

Reference now is made to FIGURE 12 which shows an enlarged view of the stroke controlling mechanism 340. It will be observed that the single revolution clutches 352 and 354 are mounted on short shafts 360 and 362 respectively which extend outwardly from a differential drive mechanism 363. Each shaft is rotatably mounted in bearings 364 and have on the ends, extending into the differential drive, bevel gears 366 secured thereon with these gears being in meshing engagement with bevel gears 368 which are rotatably carried by the spider 370. A ring gear 372 is securely fastened to the spider 370 by a plurality of bolts 374 extending through a flanged portion 376 of the spider. Another gear 378 carried by a shaft 380 extending outwardly from another differential drive 382 is in meshing engagement with the ring gear 372. Bearings 384 and a bearing 386 rotatably support the drive 382 and the shaft 380. One end of the shaft 380 extends into the drive 382 and it has mounted thereon a bevel gear 388 which is in meshing engagement with the bevel gears 390 rotatably carried by a differential spider 392.

Inasmuch as the clutches 356 and 358 are also correlated with a differential drive producing the same overall mode of operation similar numerals, followed by a prime (') are used.

The differential drive 382 also includes a ring gear 394 connected to the spider 392 by bolts 396 extending through a flange 398. In meshing engagement with the ring gear 394 is another ring gear 398 carried by the spider 400 of another differential drive 402. Axially aligned bevel gears 404 are rotatably mounted in the spider 400 and are in meshing engagement with bevel gears 406 and 408 carried on shaft 410 and 412 respectively. These shafts are rotatably supported in bearings 414. On the shaft 410 there is mounted a solid disc 416 provided with a transverse slot 418 for receiving a complementary formed portion of a pawl 420. This pawl is connected to a Jacquard string 422 operating to lift the pawl and allow rotation of the shaft 410. The shaft 412 also has a solid disc 424 including a slot 426 for receiving a complementary portion of a pawl 428. This pawl is also connected to a Jacquard string 430 operating to lift the pawl and permit rotation of the shaft 412.

By means of a gear 432 rotation of the shaft 410 is imparted to a tubular shaft 434 carrying a gear 436 meshingly engaged with the gear 432 whereas rotation of the shaft 412 imparts rotation of a solid shaft 438, by means of a gear 440, fixed to the shaft 412, and a reversing idler gear 442 and a gear 444 secured to the shaft 438. Although the shaft 438 is located in the bore of the shaft 434 it is arranged for independent rotation. Bearings 446 are provided for rotatably supporting the tubular shaft 434 and the inner solid shaft 438. By virtue of the inclusion of the idler gear 432 the shaft 438 rotates in a direction opposite to the rotation of the shaft 434. These two shafts provide an input of a predetermined amount to a mechanism, hereinafter to be explained, for adjusting the stroke of the inserter bar 42.

Still referring to FIGURE 12 it will be seen that the outputs of the single revolution clutches 352, 354, 356 and 358 are provided with pins 352a, 354a, 356a, and 358a respectively being engaged by pawls 352b, 354b, 356b, and 358b respectively. Each of the pawls are attached to Jacquard strings 448 operating to lift the pawls and permit rotation of the shafts associated with each of the single revolution clutches. The selected ratio of the gears shown in FIGURE 12 is such that actuation of one of the Jacquard strings, allowing one revolution of one clutch, will increase or decrease the stroke of the inserter bar 42 approximately four inches. If it is desired to increase the stroke eight inches any pair of the single revolution clutches may be released. Thus if all four of the single revolution clutches were released an increase or decrease in stroke of sixteen inches can be effected. When one or more of the single revolution clutches are released the pawl 420 or the pawl 428 associated with the discs 416 and 424 respectively must be released depending upon whether the stroke is being increased or decreased. Thus one of the Jacquard strings 422 or 430 must be actuated simultaneously with one or more of the Jacquard strings 448 associated with the single revolution clutches. For purposes of this description it will be assumed that rotation of the tubular shaft 434 increases the stroke of the inserter bar whereas rotation of the shaft 438 decreases the stroke of the inserter bar.

FIGURES 13 and 14 show the remaining portion of the inserter bar control mechanism and it is generally indicated by the numeral 450. This mechanism is supported in a frame structure 452 which is provided with a pair of spaced parallel guideways 454 having slidably mounted thereon a housing 456. The housing 456 carries a differential spider 458 having an elongate tubular portion 460 rotatably mounted by means of bearings 462 in the housing 456. In order to effect rotation of the spider 458 it has a bevel gear 463 formed thereon which is meshingly engaged with another bevel 464 rotatably mounted in the housing 456 by the bearing 466. The inserter drive shaft 322 which is connected to the output of the single revolution clutch 120 (see FIG. 11) has its end rotatably mounted by a bearing 468 in the frame 452. A bushing 470 which is internally splined for slidably receiving a spline shaft 472 on which the gear 464 is fixed is secured to the shaft 322 by a set screw 473. By this construction it can be seen that irrespective of the position the housing 456 assumes on the guideways 454 driving relationship between the bevel gears 463 and 464 is maintained.

It will be recalled that the inserter drive mechanism is arranged to progressively increase the stroke of the inserter bar 42 until a single loop of the weft thread extends the entire width of the loom and then to gradually decrease the stroke of the inserter bar until a weft thread of minimum length is produced. Regardless of the stroke of the inserter bar 42 it always initiates movement from a point adjacent the left hand selvage of the loom. Accordingly the mechanism shown in FIGURES 13 and 14 is provided with means to fulfill this mode of operation.

Part of the frame 452 includes an outwardly and upwardly extending outboard support 474 provided with a bearing 476 rotatably supporting the tubular shaft 434. On the end of the tubular shaft a bevel gear 478 is secured and it is in meshing engagement with idler bevel gears 480 rotatably mounted in laterally spaced spider frame 482. This frame is integral with a spur gear 484 having a shaft portion 486 rotatably mounted in the frame 452 by bearings 488. The shaft 438, which is located in the bore of the tubular shaft 434, extends beyond the bevel gear 478 and has a bevel gear 490 secured thereon with this bevel gear being in meshing engagement with the idler bevel gears 480.

The spur gear 484 meshes with spur gears 494 and 496. This spur gear 494 is formed with an axial extension 498 which is received in bearings 500 carried by the frame 452. A spline shaft 502 is slidably mounted in a splined bore formed in the spur gear 494. The spline shaft has one end rotatably supported by a bearing 506 mounted in a lateral extension 508 of the housing 456. This shaft has a gear 510 fixed thereon which is meshingly engaged with another gear 512 secured to a shaft 514 extending through bearings 516 mounted in the differential spider 458. The shaft 514 also carries a bevel gear 518 being meshingly engaged with idler bevel gears 520 rotatably supported in the differential spider 458. Another bevel gear 522 meshes with the bevel gears 520 and it is supported on a short shaft 524 located in a bearing 526 supported in a transverse wall 528.

Another bevel gear 530 is also carried by the shaft 524 and it is in meshing engagement with a bevel gear 532 which is pinned to a lead screw 534 located in an elongate slot 536 which slidably receives a block 538 which has a threaded bore through which the lead screw is threadedly engaged. The block 538 has an outwardly extending projection upon which is mounted a crank arm 540. Translation of the block 538 in the slot 536 takes place whenever the screw 543 is rotated by the bevel gear 532. The structure described immediately above fulfills the function of changing the stroke of the shuttle inserting bar 42.

Referring to FIGURE 1 it will be seen that the crank arm 540 extends through a U-shaped cradle 542 which is rotatably mounted on a shaft having gears 544 and 546 keyed thereon. The crank arm 540 is provided with gear teeth meshingly engageable with the gear 544 and held in such meshing engagement by the U-shaped cradle 542. As the crank arm 540 is reciprocated due to the rotation of the differential spider 548 (FIG. 14) by the input gear 464, the gear 544 is rotated causing a rotation of the gear 546 and the output gear 44 which is mounted on a common shaft having the gear 548, which meshes with the gear 546, impart rotation to the output gear 44. As previously mentioned the inserter bar 42 is provided with a rack portion which is engaged by the teeth of the gear 44. It is apparent therefore that the extent to which the output gear 44 will be rotated is dependent upon the distance of the block 538 (FIG. 14) from the imaginary axis of the shaft 514.

The stroke adjusting mechanism operates in the following manner. Assuming it is desired to increase the length of the weft thread 4 inches, one of the described single revolution clutches shown in FIGURE 12 is released for rotation by actuating one of the Jacquard strings 448 to raise the pawl associated therewith. Simultaneously with the actuating of the Jacquard string 448 the Jacquard string 442 is actuated raising the pawl 420 in order to permit rotation of the shaft 410 (FIG. 12). By virtue of the gears 432 and 436 rotation of the tubular shaft 434 is effected. It will be recalled that rotation of the tubular shaft 434 provides an increase in stroke.

Referring now to FIGURE 14 it will be seen that rotation of the shaft 434 rotates the bevel gear 478 and of course the idler bevel gears 480 which are engaged therewith. The bevel gear 490 is held against rotation. Since the bevel gears 480 are carried by the spaced spider frame 482 the spur gear 484 is caused to rotate which in turn rotates the spur gear 494 and of course the shaft 502 by virtue of the spline connection. Since the bevel gear 510 is connected to the spline shaft 502 it also rotates which in turn rotates the bevel gear 512 and also the bevel gears 520. The bevel gear 530 is rotated causing rotation of the bevel gear 532 and of course the screw 534 advancing the block 538 a greater distance from the axis of the shaft 514. Rotation of bevel gear 530 is relative to rotation of the spider 458.

Each time the throw of the block 538 is changed it is necessary to reposition the housing 456 so that the inserter bar 42 will commence movement of the shuttle from a point closely adjacent the left hand selvage of the cloth. To fulfill this function means are provided for moving the housing 456 along the guide bars 454 at the same time that the guide block 538 is adjusted. Referring again to FIGURE 14 it will be seen that the spur gear 496, which is in meshing engagement with the spur gear 484, is provided with a threaded bore through which is threadly disposed an elongate screw 549. One end of the screw is securely fastened to the housing 456 by a pin 550. Whenever the spur gear 484 is rotated, whether it be for increasing or decreasing the stroke of the inserter bar 42 the spur gear 496 also rotates causing the translation of the screw 549 and accordingly causing movement of the housing 456 on the guide bars 454.

Whenever the stroke is increased as above described the spur gear 496 rotates in a direction moving the housing 456 to the right, as viewed in FIGURE 14, which will insure return of the inserter bar to the desired position.

Another feature of this invention relates to the pressure rolls 36 which are located above the tapered take up roller and serve to press the cloth in forceable engagement with a peripheral portion of the tapered take up roller. The arrangement of these pressure rolls is most clearly illustrated in FIGURE 15. Reference to FIGURE 1 will show that a plurality of closely transversely spaced pressure rolls are provided although the description as it pertains to FIGURE 15 will only refer to one of these rollers. On a transverse brace 552 attached to the main frame of the loom there is secured a plurality of laterally spaced plates 554 rotatably supporting a shaft 556 which is coextensive and generally parallel to the brace 552. Each pair of pressure rollers 558 are rotatably mounted on a short shaft 560 which is welded on an outwardly extending arm 562 being pivotally connected to the plates 554 by a pin 564. Each of the arms 562 are biased in a clockwise direction, as viewed in FIGURE 15, by means of a clock spring 566 including an outwardly extending arm 568 lying on the upper surface of the arms 562. The shaft 556 is associated with a rachet and pawl mechanism located at one end thereof which is operable to increase or decrease the bias of all of the springs which in turn increases the pressure of contact between the rollers 558 and the tapered take up roller 34.

Since it is not possible to collect the curvilinear cloth on a take up spool, which is the usual manner of applying tension to the warp threads in straight weaving, the pressure rollers 558 fulfill this same function. In addition if it is desired to change the radius of curvature of the circular cloth desired to be made requiring changing of the tapered take up roller 34 the pressure rollers 558 readily adapt themselves to this change in cloth curvature. In describing the operation of this invention reference is made to FIGURES 16 and 17 which show respectively the timing diagram and a representative pattern of weft threads which are formed by the loom of this invention. Referring to FIGURE 16 it is to be noted that the upper horizontal line starting from 0° and ending at 360° represents one complete rotation of the main shaft 46. This distance is divided in 30° increments. The memory cards 64 of the Jacquard 50 are programed to normally maintain all of the heddle frames 214 in their raised position. Upon commencing weaving of the triangular pattern shown in FIGURE 17 a weft thread of minimum length is to be inserted through the warp threads and such minimum length will be taken as four inches for the purposes of this description. This weft thread is indicated by W' in FIGURE 17.

The Jacquard accordingly manipulates longitudinally adjacent pairs of heddles on the extreme left hand side of the machine to produce a shed of approximately four inches in length with the remaining heddles being maintained in their upper position. The main shaft 46 is shown at its zero position locating one of the pins 330 in position to actuate the pawl 332 releasing the single revolution clutch 124. As shown in FIGURE 16 this one revolution clutch completes a single revolution during the time the main shaft rotates 30 degrees. Through the agency of the crank 74 the linkage system 52 actuates the Jacquard thereby producing the shed of four inches in length. At the 30° position of the main shaft the single revolution clutch 120, which has its output connected to the inserter drive shaft 322, is released by one of the pins 316 mounted on the gear 108. During the time it takes the main shaft to rotate from the 30° position to the 120° position the shaft 322 makes one revolution which also rotates the differential spider 458 one revolution since the gears 463 and 464 are sized to establish a 1:1 ratio. When the differential housing 458 has revolved 180°, the inserter bar 42 reaches the end of its stroke and at this point, which is approximately the 75° mark of the main shaft, the cam surface 274 actuates the limit switch energizing the electromagnet in the lay beam 32 causing the bar 284 in the shuttle to be rotated against the bias of the spring 292 thus releasing the shuttle from the inserter bar 42. After release of the shuttle the inserter bar 42 returns to its starting position.

After the inserter bar has returned to its starting position one of the throws of the cam track 302 reciprocates the lay beam beating the weft thread carried by the shuttle tightly into position and then the lay beam returns to the position shown in FIGURE 11 still carrying the shuttle thereon. The first beatup stroke occurs when the main shaft has rotated from the 120° to the 180° position.

At the 180° position another of the pins 330 raises the pawl 332 releasing the single revolution clutch 124 actuating the linkage system 52 in order to reverse the heddles. During this time the main shaft has rotated an additional 30° and has now completed 210° of its rotation. The second pin 316 on the gear 108 now raises the pawl 318 releasing the single revolution clutch 120 which again extends the inserter bar 42 toward the shuttle which is held by the lay beam and enters the catch mechanism 282 on the shuttle. At this instant, the 255° mark on the main shaft, the cam surface 274 actuates the limit switch de-energizing the electromagnet in the lay beam allowing the bar 284 to again engage the end of the inserter bar 42. On this stroke the inserter bar brings the shuttle back to a position adjacent the left hand selvage of the cloth.

As soon as the shuttle is clear of the shed the second throw of the cam track 302 reciprocates the lay beam again beating the weft thread deposited by the shuttle when it was drawn back by the inserter bar.

By reference to FIGURE 16 it will be seen that the second beatup stroke takes place when the shaft rotates from its 300° mark to its 360° mark. At the 300° mark of the main shaft one or more of the Jacquard strings 448 and the Jacquard string 422 is actuated by the Jacquard pivoting the pawls associated therewith so that the stroke of the inserter bar 42 may be increased. Referring to FIGURE 17 it will be seen that the second weft thread to be inserted is designated by W'' and the difference in length between these two weft threads, that is W' and W'' is eight inches. Since release of any one of the clutches 352, 354, 356 or 358 will provide an increase in stroke of four inches any two of these clutches may be released to increase the stroke of the inserter bar eight inches. Let it be assumed that the Jacquard strings 448 associated with the clutches 352 and 354 are actuated to release the pawls. To increase the stroke, the tubular shaft 434 must be rotated thus requiring actuation of the Jacquard string 422. Upon release of the clutches 352 and 354 and the disc 416, the shaft 434 is rotated a sufficient amount to rotate the lead screw 534 increasing the distance of the block 538 from the axis of the shaft 514. Simultaneously therewith the housing 456 is translated on the guide bars 454 (to the right as viewed in FIGURE 14) by the screw 549 which is translated during rotation of the spur gear 496. Such translatory adjustment of the housing 456 insures repositioning of the inserter bar and the shuttle closely adjacent the left hand selvage of the material whenever the stroke of the inserter bar is increased or decreased. Rotation of the shaft 438 in the opposite direction will incrementally decrease the stroke of the inserter bar when the Jacquard string 430 is actuated raising the pawl 428 and thereby permitting rotation of the shaft 412.

This adjustment of the inserter bar 42 takes place during 90° rotation of the main shaft commencing at the 300° mark and terminating at the 30° mark. This is shown in FIGURE 16.

The one revolution clutch 122, which is connected to actuate the linkage system 54, makes one complete revolution during the time it takes the main shaft to rotate 30°. As shown in FIGURE 11 the gear 110 has three pins 324 mounted thereon for pivoting the pawl 326 in order to release the single revolution clutch 122. After the main shaft has completed 150° rotation one of these pins actuates the pawl permitting the single revolution clutch to actuate the linkage system 54 causing the drum 62 to index and thereby present another memory card to the mechanical reader. After the main shaft 46 has rotated 270° the single revolution clutch is again released to actuate the linkage system 54 presenting another memory card to the mechanical reader. Here again this takes place within 30° rotation of the main shaft and is terminating at the 300° mark. The third time the single revolution clutch 122 is actuated commences at the 330° mark of the main shaft and terminates at the 360° mark.

Since the standard Jacquard can be designed to raise any or all of the Jacquard strings at any time, depending upon the memory card which is presented to it, the strings 60 are attached to the Jacquard frame which is normally held in a raised position whereas the strings 422, 430 and 448 are attached to the Jacquard frame which is normally held in a lower position. Each time the heddle frames are switched a memory card releases some of the heddle strings from the Jacquard frame which is normally raised to permit switching or to produce a change in the length of the shed. All of the strings 422, 430 and 448 are kept detached from the Jacquard frame which is normally in the lower position during heddle actuation. Only when the main shaft rotates from the 300° to the 330° position, are desired ones of the Jacquard strings 422, 430 and 448 momentarily attached to the Jacquard frame which is normally held in a lower position thereby raising the desired pawls to effect adjustment of the stroke of the inserter bar.

Thus it is seen that this invention discloses a structure which can reliably produce curvilinear cloth of any desired radius since a change in radius only requires replacement of the tapered take up roller. In addition the provision of a novel tensioning device imposes a predetermined equal amount of tension to each of the warp threads irrespective of the fact that they are drawn through the loom at different rates. Furthermore the provision of the lay beam including an electromagnet in cooperation with the unique shuttel makes possible the insertion of various lengths of weft thread which are properly tensoned.

Having thus described the invention what is claimed as new and desired to be secured by Letters Patent is:

1. A loom for producing curvilinear cloth comprising, means mounting a plurality of transversely aligned warp spools providing warp threads, means for withdrawing the warp threads from said spools at a rate which increases between the selvages of such cloth, two rows of narrow heddle frames operable to produce a shed of progressively increasing and decreasing width, a shuttle stroke operating mechanism for progressively increasing and decreasing the stroke of the shuttle in accordance with the width of such shed, and means for maintaining a desired tension on all of the warp threads.

2. A loom for producing curvilinear cloth having laterally spaced selvages comprising, means mounting a plurality of transversely aligned warp threads, means for advancing the warp threads at a rate which increases from one to the other selvage, a warp tensioning device including a transverse tube having a flexible sheet in intimate contact with a peripheral portion thereof to thereby create a restricted passageway, said warp threads passing through and being tensioned as they traverse such passageway, a heddle mechanism operable to produce a shed of progressively increasing width, and a shuttle and a shuttle operating mechanism for advancing the shuttle a distance sufficient to introduce a weft thread through such shed thereby laying a weft thread therein, said tensioning device further including means for controlling the amount of tension applied to the warp threads.

3. In a loom for weaving curilinear cloth, means providing a source of warp threads, means for feeding such threads at different incremental rates so that the warp thread at one side of the warp advances a greater distance than the thread at the other side means for tensioning each warp thread, said tensioning means comprising a device for applying friction to each warp thread and being effective to maintain them taut, said tensioning means further comprising a stationary tubular member and a flexible member for contacting a peripheral portion of said stationary member, and a means for varying the tension of said flexible member in order to accordingly vary the tension of the warp threads.

4. In a loom for weaving curvilinear cloth, said loom having a frame structure, means providing a source of warp threads, means for feeding such threads at different rates so that the warp thread at one side of the warp advances a greater distance than the thread at the other side and means for tensioning each warp thread, said tensioning means comprising a stationary circular member supported to the frame of the loom and extending generally normal to the direction at which the warp threads are fed, a rotatably mounted clamp parallel to and of substantially the same length as said circular member, a roller rotatably supported in spaced relation to said clamp by arms carried on the ends of said clamp, means biasing said arms to urge them in an arcuate direction relative to the axis of said clamp, a belt extending transversely of the loom having one longitudinal edge secured to said clamp and the remaining edge secured to a transverse brace of the loom to assume a position bringing a portion of said belt in contact with a peripheral portion of said circular member, and means for detachably connecting said arms to said clamp to render said biasing means effective to tension said belt in order to hold said belt in intimate contact with such peripheral portion of said stationary member, said warp threads being positioned to pass over said peripheral portion and over the roller supported by said arms.

5. In a loom for producing curvilinear cloth, a device having a plurality of outputs actuated in accordance with an input program which determines the sequence at which such outputs are actuated, a heddle apparatus comprising a plurality of individual heddle frames disposed in adjacent transverse rows, means connecting each of said heddle frames to certain outputs of said device to thereby effect actuation of said heddle frames to produce a shed of progressive increasing and decreasing width, and a shuttle actuating mechanism operable in response to other outputs of said device for moving a shuttle attached thereto a distance proportional to such increases and decreases in the width of the shed.

6. In a loom for producing curvilinear cloth having laterally spaced selvages, a Jacquard mechanism having a plurality of outputs actuated in accordance with an input program which determines the sequence at which such outputs are actuated, two transverse longitudinally adjacent guideways, a plurality of individual heddle frames slidably fitted in each of such guideways with the frames in one guideway being longitudinally aligned with the frames in the other guideway, means connecting each of said heddle frames to an output of said Jacquard which is programmed to actuate said heddle frames to produce a shed of progressively increasing and decreasing width, and a shuttle actuating mechanism operated by an output of said Jacquard for moving a shuttle a distance proportional to such increases and decreases in the width of the shed, said shuttle actuating mechanism including means for initiating movement of the shuttle from a reference point adjacent one selvage of the cloth regardless of such increases and decreases of the distance the shuttle is moved.

7. A shuttle inserting mechanism for progressively increasing and decreasing the stroke of the shuttle from a reference point, said mechanism comprising an elongate shuttle inserting member adapted to releasably carry a shuttle, and means for reciprocating said inserting member from the reference point to the end of the particular stroke.

8. A shuttle inserting mechanism for producing a stroke pattern which progressively increases and decreases from a reference point in accordance with a selected pattern, said mechanism comprising an elongate shuttle inserting member adapted to releasably carry a shuttle, means for reciprocating said inserting member from the reference point to the end of the particular stroke of the pattern, and means for varying the extent to which said means reciprocates said member.

9. A shuttle inserting mechanism for producing a stroke pattern which progressively increases and decreases from a reference point in accordance with a selected pattern, said mechanism comprising an elongate shuttle inserting member adapted to releasably carry a shuttle, means for reciprocating said inserting member from the reference point to the end of the particular stroke of the pattern, said reciprocating means comprising a transmission having a crank pin describing an orbital path and arranged to reciprocate said member, and means for varying the orbital diameter of said pin so that such increases and decreases of said stroke from said reference point are attained.

10. A shuttle stroke controlling apparatus for varying the stroke of a shuttle from a selected reference point comprising, a support mounted for translatory rectilinear movement in opposite directions, a housing mounted on said support for rotation about an axis which is normal to the direction of such rectilinear movement of said support, a crank pin carried by said housing and having its axis parallel to the axis about which said housing rotates, means for moving said crank pin relative to the axis of rotation of said housing, and means for translating said support to displace the axis about which said housing rotates a sufficient distance to maintain the orbit of said crank pin passing through such reference point.

11. A shuttle stroke controlling apparatus for varying the stroke of a shuttle from a selected reference point comprising, a support mounted for translatory rectilinear movement in opposite directions, a housing mounted on said support for rotation about an axis which is normal to the direction of such rectilinear movement of said support, a crank pin carried by said housing and having its axis parallel to the axis about which said housing rotates, a shaft, means controlled by a Jacquard mechanism for rotating said shaft a predetermined number of revolutions, means actuated by the rotation of said shaft for moving said crank pin relative to the axis of rotation of said housing, and means operated by said shaft for translating said support to displace the axis about which said housing rotates a sufficient distance to maintain the orbit of said crank pin passing through such reference point.

12. A shuttle stroke controlling apparatus for increasing and decreasing the stroke of a shuttle from a selected reference point comprising, a support mounted for translatory rectilinear movement in opposite directions, a housing mounted on said support for rotation about an axis which is normal to the direction of such rectilinear movement of said support, a crank pin carried by said housing and having its axis parallel to the axis about which said housing rotates, a pair of shafts, means controlled by a Jacquard mechanism for rotating said shafts at alternate times a predetermined number of revolutions in opposite directions, a transmission operated by said shafts for moving said crank pin relative to the axis of rotation of said housing, means operated by said shafts for translating said support to displace the axis about which said housing rotates a sufficient distance to maintain the orbit of said crank pin passing through such reference point whether it be an increase or decrease in stroke, and means connecting the shuttle to said crank pin.

13. A lay beam for a loom comprising; an elongate bar, a reed structure mounted on said bar for beating weft threads into position; an electromagnet carried by said bar and extending the entire length thereof for retaining a shuttle at any position along the length of said bar when said electromagnet is energized, means for reciprocating the shuttle, and means operable in time relation with the reciprocation of the shuttle for energizing and de-energizing said magnet.

14. In a loom of the character described, a shuttle body, an elongate magnetizable metal plate mounted on said body, a catch mechanism operable to detachably connect said shuttle body to a reciprocating inserter bar, said mechanism including a pivoted spring biased magnetizable catch, an oscillating lay beam, a magnet carried by and extending the entire length of said lay beam, means for energizing and de-energizing said magnet in time relation with the oscillation of said lay beam, said magnet being operable to attract and hold said shuttle thereon by magnetizing said metal plate and to pivot said catch allowing said inserter bar to be detached therefrom in timed relation with the oscillation of said lay beam.

15. A loom for weaving curvilinear cloth comprising a frame, a plurality of transversely aligned V-shaped brackets supported on said frame; warp spools supported on each of said brackets, a tensioning device for tensioning each of the warp thread played out by said spools, a heddle mechanism including heddles connected to a central apparatus which is programed to normally maintain the heddles in a raised position and to manipulate the heddles to produce a shed of progressively varying width, a weft thread inserting mechanism including a reciprocable inserter bar and a shuttle detachably connected thereto, means operated by said control apparatus for progressively increasing the distance said inserted bar is reciprocated in accordance with the width of the shed, a lay beam including means for detaching and holding the shuttle thereon during beating of the weft thread, and means for pinching the cloth in contact with a peripheral portion of a tapered take-up roll so that positive differential feeding of the warp thread is effected.

References Cited

UNITED STATES PATENTS

| | | | |
|---|---|---|---|
| 889,971 | 6/1908 | Salisbury | 139—12 |
| 1,742,891 | 1/1930 | Ambler | 139—97 |
| 2,812,779 | 11/1957 | Brown | 139—100 |
| 3,258,035 | 6/1966 | Fend | 139—12 |

FOREIGN PATENTS

| | | |
|---|---|---|
| 325,565 | 1/1903 | France. |
| 303,119 | 5/1929 | Great Britain. |

MERVIN STEIN, *Primary Examiner.*

HENRY S. JAUDON, *Examiner.*

UNITED STATES PATENT OFFICE
CERTIFICATE OF CORRECTION

Patent No. 3,347,278                                                October 17, 1967

Mathew G. Boissevain

It is hereby certified that error appears in the above numbered patent requiring correction and that the said Letters Patent should read as corrected below.

Column 2, line 67, "7" should read -- 1 --. Column 6, line 41, "spring" should read -- springs --. Column 7, lines 22 and 23, "Rrefering" should read -- Refering --; line 61, "224" should read -- 244 --. Column 8, line 37, "266" should read -- 268 --. Column 9, line 46, "in" should read -- is --. Column 10, line 59, "shaft" should read -- shafts --. Column 12, line 31, "543" should read -- 534 --; line 41, "reciprated" should read -- reciprocated --; line 42, "548" should read -- 458 --. Column 15, line 66 and column 16, line 72, "shuttel", each occurrence, should read -- shuttle --. Column 17, line 45, cancel "such".

Signed and sealed this 2nd day of September 1969.

(SEAL)
Attest:

EDWARD M. FLETCHER, JR.                      WILLIAM E. SCHUYLER, JR.
Attesting Officer                                    Commissioner of Patents